United States Patent
Arai et al.

(10) Patent No.: US 9,664,948 B2
(45) Date of Patent: May 30, 2017

(54) LIQUID CRYSTAL DISPLAY

(71) Applicant: ORTUS TECHNOLOGY CO., LTD., Hino-shi, Tokyo (JP)

(72) Inventors: Norihiro Arai, Hino (JP); Kunpei Kobayashi, Hino (JP); Ryota Mizusako, Hino (JP)

(73) Assignee: ORTUS TECHNOLOGY CO., LTD., Tokyo (JP)

( * ) Notice: Subject to any disclaimer, the term of this patent is extended or adjusted under 35 U.S.C. 154(b) by 60 days.

(21) Appl. No.: 14/644,870

(22) Filed: Mar. 11, 2015

(65) Prior Publication Data

US 2015/0185556 A1    Jul. 2, 2015

Related U.S. Application Data

(63) Continuation of application No. PCT/JP2013/079319, filed on Oct. 29, 2013.

(30) Foreign Application Priority Data

Nov. 2, 2012 (JP) ................. 2012-242715

(51) Int. Cl.
| | |
|---|---|
| *G02F 1/1335* | (2006.01) |
| *G02F 1/1334* | (2006.01) |
| *G02F 1/1333* | (2006.01) |
| *G02F 1/1368* | (2006.01) |
| *G02F 1/1362* | (2006.01) |

(52) U.S. Cl.
CPC ...... G02F 1/133553 (2013.01); G02F 1/1334 (2013.01); G02F 1/1368 (2013.01); G02F 1/133345 (2013.01); G02F 1/133512 (2013.01); G02F 1/136213 (2013.01);
(Continued)

(58) Field of Classification Search
CPC ......... G02F 1/133553; G02F 1/133555; G02F 2001/136222
See application file for complete search history.

(56) References Cited

U.S. PATENT DOCUMENTS 5,206,632 A * 4/1993 Dupont ................ G09G 3/2011
                                                                345/92
2003/0122980 A1 7/2003 Jin et al.
(Continued)

FOREIGN PATENT DOCUMENTS

| CN | 101271237 A | 9/2008 |
|---|---|---|
| JP | 11-133391 | 5/1999 |

(Continued)

OTHER PUBLICATIONS

Machine Translation of JP2003195350 Jul. 9, 2003.*
(Continued)

*Primary Examiner* — Phu Vu

(57) ABSTRACT

A liquid crystal display includes: first and second substrates; a liquid crystal layer sandwiched between the first and second substrates and comprising a polymer network liquid crystal (PNLC) or a polymer dispersed liquid crystal (PDLC); a common electrode provided on the first substrate; transistors provided on the second substrate for respective pixels; a reflective film provided on the transistors; a color filter provided on the reflective film; and pixel electrodes provided on the color filter and electrically connected to drain electrodes of the respective transistors.

10 Claims, 12 Drawing Sheets

(52) U.S. Cl.
CPC .............. *G02F 2001/13345* (2013.01); *G02F 2001/136222* (2013.01); *G02F 2201/40* (2013.01); *G02F 2203/02* (2013.01)

(56) References Cited

U.S. PATENT DOCUMENTS

| | | |
|---|---|---|
| 2003/0164912 A1 | 9/2003 | Eguchi et al. |
| 2004/0263722 A1 | 12/2004 | Oh et al. |
| 2005/0151901 A1 | 7/2005 | Kikkawa et al. |
| 2005/0275776 A1 | 12/2005 | Ohue et al. |
| 2008/0231779 A1 | 9/2008 | Shin et al. |
| 2010/0309416 A1 | 12/2010 | Gotoh |
| 2011/0096261 A1 | 4/2011 | Kobayashi et al. |
| 2011/0317112 A1* | 12/2011 | Asaoka ............. G02F 1/133509 349/113 |
| 2012/0113360 A1 | 5/2012 | Lee et al. |
| 2012/0162557 A1 | 6/2012 | Nakazawa |

FOREIGN PATENT DOCUMENTS

| | | |
|---|---|---|
| JP | 2000-147493 | 5/2000 |
| JP | 2003-195350 | 7/2003 |
| JP | 3736076 | 1/2006 |
| JP | 2006-30951 | 2/2006 |
| JP | 2010-281925 | 12/2010 |
| JP | 2011-95407 | 5/2011 |
| JP | 2012-27150 | 2/2012 |
| JP | 2012-103695 | 5/2012 |
| WO | WO 2010/137200 A1 | 12/2010 |
| WO | WO 2011/045953 A1 | 4/2011 |

OTHER PUBLICATIONS

International Search Report mailed Feb. 4, 2014 for corresponding International Patent Application No. PCT/JP2013/079319.
Japanese Office Action dated Mar. 1, 2016 in corresponding Japanese Patent Application No. 2014-544536.
Extended European Search Report dated Jun. 9, 2016 in corresponding European Patent Application No. 13850282.8.
PCT International Preliminary Report on Patentability dated May 14, 2015 in corresponding International Patent Application No. PCT/JP2013/079319.
Chinese Office Action dated Aug. 19, 2016 in corresponding Chinese Patent Application No. 201380047271.6.
Japanese Office Action dated Sep. 20, 2016 in corresponding Japanese Patent Application No. 2014-544536.
Chinese Office Action dated Mar. 28, 2017 in corresponding Chinese Patent Application No. 201380047271.6.
Japanese Office Action dated Apr. 4, 2017 in corresponding Japanese Patent Application No. 2014-544536.

* cited by examiner

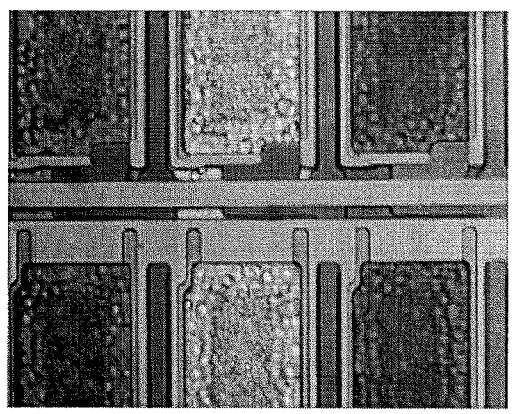
F I G. 9B
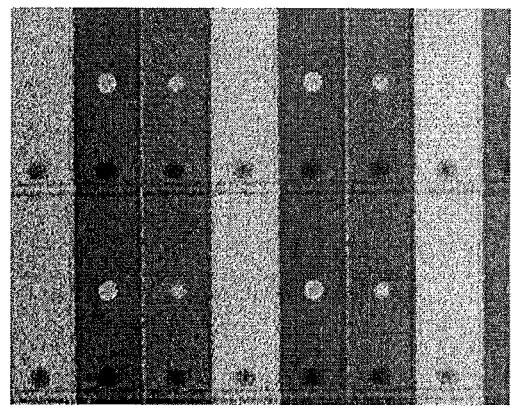
F I G. 10A
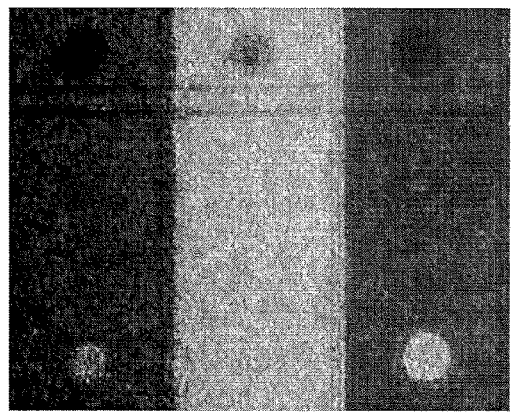
F I G. 10B

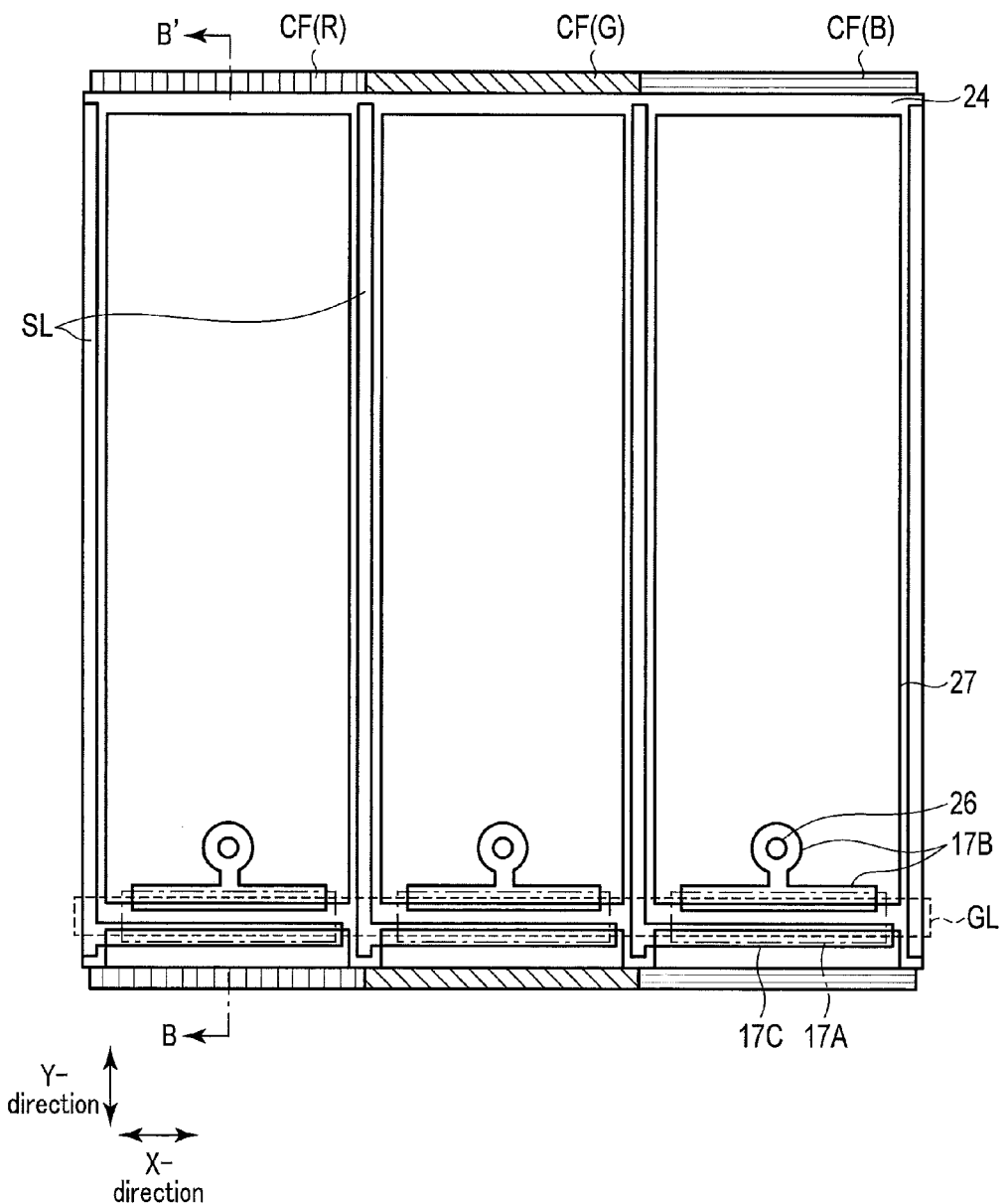
F I G. 13

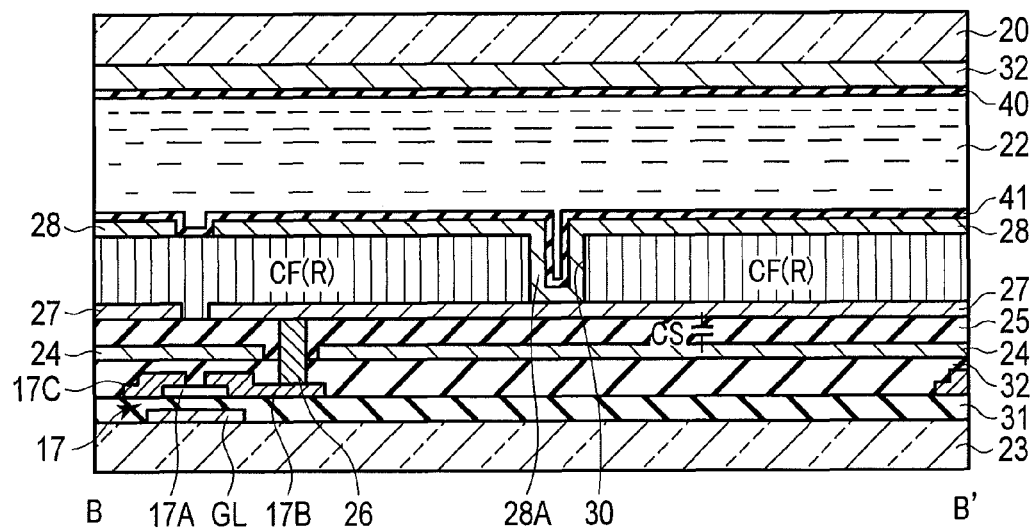
F I G. 16
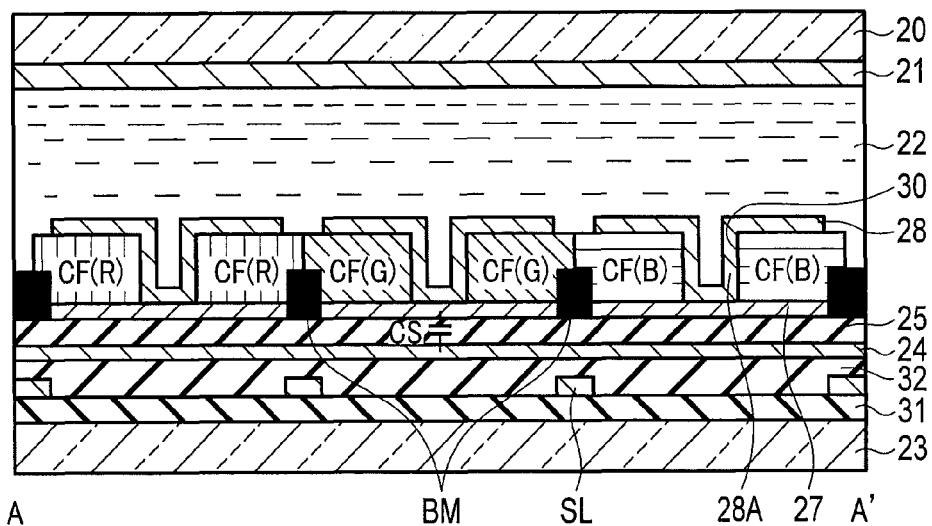
F I G. 17

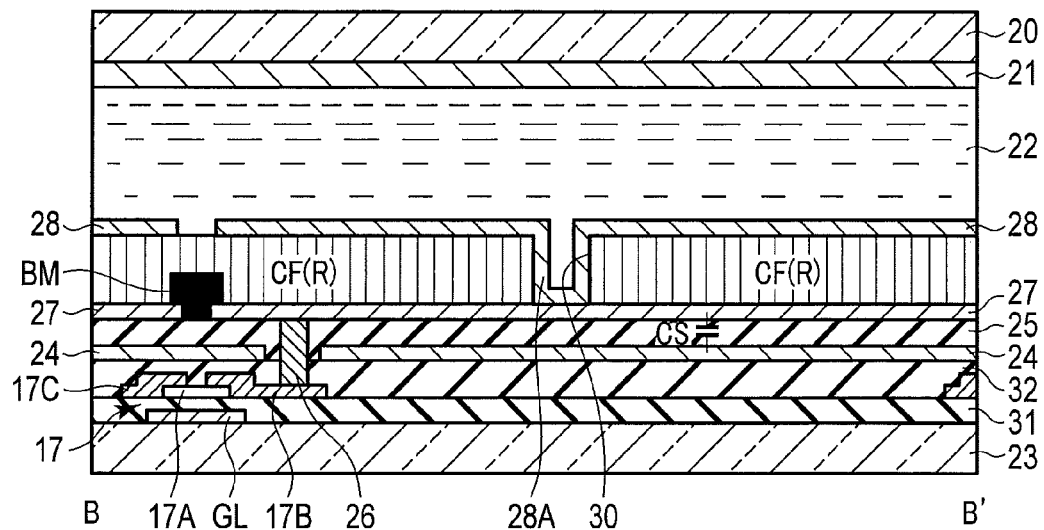
F I G. 18
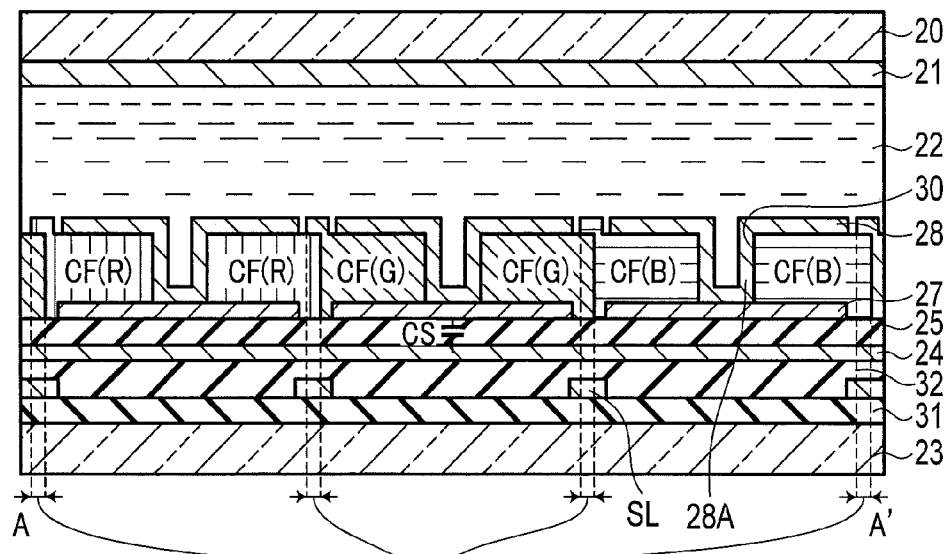
Overlapping portion (light-shielding layer)
F I G. 19

LIQUID CRYSTAL DISPLAY

CROSS-REFERENCE TO RELATED APPLICATIONS

This application is a Continuation Application of PCT Application No. PCT/JP2013/079319, filed Oct. 29, 2013, and based upon and claiming the benefit of priority from Japanese Patent Application No. 2012-242715, filed Nov. 2, 2012, the entire contents of all of which are incorporated herein by reference.

BACKGROUND OF THE INVENTION

1. Field of the Invention

The present invention relates to a liquid crystal display, and in particular, to a reflective color liquid crystal display.

2. Description of the Related Art

A reflective liquid crystal display is known which displays images utilizing reflected light resulting from reflection of incident light by a reflective film formed on a back surface side of a liquid crystal. An example of the reflective liquid crystal display is a polymer network liquid crystal display (PNLCD) using polymer network liquid crystals (PNLCs). Unlike a display using normal liquid crystals, the PNLCD eliminates the need for a polarizing plate and thus enables bright reflective display.

For the PNLC, ultraviolet light is radiated to a solution containing photopolymerized precursors (monomers) mixed with liquid crystals to polymerize the monomers so that the liquid crystals are dispersed in the network of the resultant polymer. In a color PNLCD based on an active matrix scheme, for example, a color filter substrate (CF substrate) comprising a color filter and on which a reflective film is formed is disposed on the back side of a display surface, and a TFT substrate with TFTs (Thin Film Transistors) is disposed on the front side of the display surface.

Ultraviolet light is radiated to a cell in order to polymerize the monomers. However, when the reflective film is provided on the TFT substrate side, the ultraviolet light is radiated from the CF substrate side, and in this case, the color filter absorbs the ultraviolet light, disadvantageously preventing the monomers from being polymerized. Thus, the reflective film is formed on the CF substrate side and the TFT substrate is formed to be transmissive so that the monomers are polymerized by radiating ultraviolet light from the TFT substrate side.

However, disadvantageously, wiring lines around pixels on the TFT substrate may act to make the polymerization of the monomers near the wiring lines incomplete, reducing reflectance (scattering performance) and reliability. Another problem is that, since the CF substrate with the reflective film is disposed on the back side of the display surface, whereas the TFT substrate is disposed on the front side of the display surface, reflected light from the back surface of the TFT substrate may affect display performance (make the display garish) to significantly degrade visibility. Another problem is that areas in which the wiring lines and transistors are disposed are prevented from being utilized for display, aperture ratio may decrease.

BRIEF SUMMARY OF THE INVENTION

According to an aspect of the present invention, there is provided a liquid crystal display comprising:
first and second substrates;
a liquid crystal layer sandwiched between the first and second substrates and comprising a polymer network liquid crystal (PNLC);
a common electrode provided on the first substrate;
transistors provided on the second substrate for respective pixels;
a reflective film provided on the transistors;
a color filter provided on the reflective film; and
pixel electrodes provided on the color filter and electrically connected to drain electrodes of the respective transistors.

According to an aspect of the present invention, there is provided a liquid crystal display comprising:
first and second substrates;
a liquid crystal layer sandwiched between the first and second substrates and comprising a polymer dispersed liquid crystal (PDLC);
a common electrode provided on the first substrate;
transistors provided on the second substrate for respective pixels;
a reflective film provided on the transistors;
a color filter provided on the reflective film; and
pixel electrodes provided on the color filter and electrically connected to drain electrodes of the respective transistors.

BRIEF DESCRIPTION OF THE SEVERAL VIEWS OF THE DRAWING

FIG. 9B is a diagram illustrating the state of the liquid crystal layer according to the comparative example.

FIG. 10A is a diagram illustrating the state of a liquid crystal layer according to the first embodiment.

FIG. 10B is a diagram illustrating the state of the liquid crystal layer according to the first embodiment.

FIG. 13 is a layout of a liquid crystal panel according to a second embodiment.

FIG. 16 is a cross-sectional view of a liquid crystal panel according to a fourth embodiment.

FIG. 17 is a cross-sectional view of a liquid crystal panel according to a fifth embodiment, taken along an X-direction.

FIG. 18 is a cross-sectional view of the liquid crystal panel according to the fifth embodiment, taken along a Y-direction.

FIG. 19 is a cross-sectional view of the liquid crystal panel according to the fifth embodiment, taken along the X-direction.

DETAILED DESCRIPTION OF THE INVENTION

Figure 1:
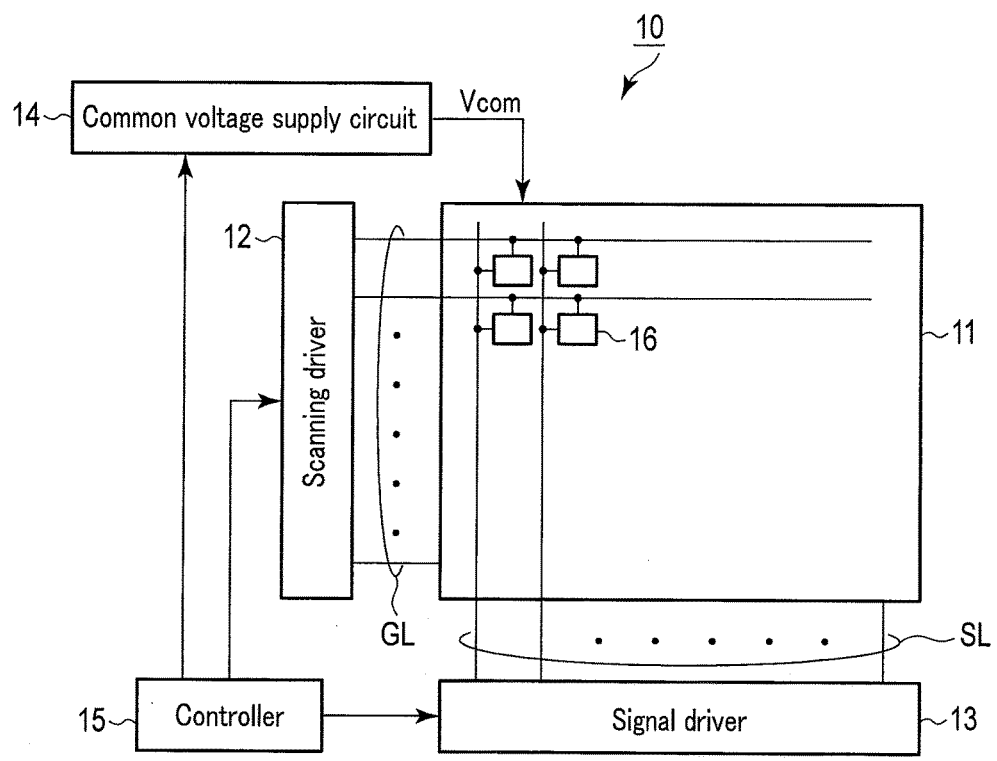
FIG. 1 is a block diagram of a liquid crystal display according to a first embodiment.

The embodiments of the present invention will be described below with reference to the accompanying drawings. Note that the drawings are schematic and conceptual, and the dimensions, ratios, and the like in the respective drawings are not necessary the same as those in reality. In addition, even the same portion may be shown in a different dimensional relationship or with different ratios in different drawings. Several embodiments to be described below represent examples of apparatuses and methods for embodying the technical idea of the present invention, and the technical idea of the present invention is not specified by the shapes, structures, and layouts of the constituent parts. The technical idea of the present invention can be embodied by modifying constituent elements without departing from the gist of the invention. Note that in the following explanation, the same reference numerals denote elements having the same functions and arrangements, and a repetitive explanation will be made only when necessary.

[First Embodiment]

FIG. 1 is a block diagram of a liquid crystal display 10 according to the first embodiment. The liquid crystal display 10 comprises a liquid crystal panel 11, a scanning driver (scanning line driving circuit) 12, a signal driver (signal line driving circuit) 13, a common voltage supply circuit 14, and a controller 15.

The liquid crystal panel 11 comprises a plurality of scanning lines GL each extending in a row direction (X-direction) and a plurality of signal lines SL each extending in a column direction (Y-direction). Pixels 16 are each disposed at a crossing area between each of the plurality of scanning lines GL and a corresponding one of the plurality of signal lines SL. The plurality of pixels 16 is arranged in a matrix.

Figure 2:
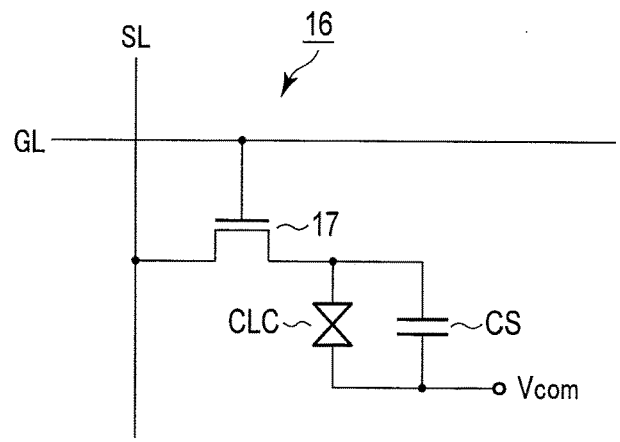
FIG. 2 is a circuit diagram of a pixel.

FIG. 2 is a circuit diagram of one pixel 16. The pixel 16 comprises a thin film transistor (TFT) 17, a liquid crystal capacitor CLC, and a storage capacitor CS.

A source of the TFT 17 is electrically connected to the signal line SL. Agate of the TFT 17 is electrically connected to the scanning line GL. A drain of the TFT 17 is electrically connected to a pixel electrode. The pixel electrode provides the liquid crystal capacitor CLC along with a common electrode disposed opposite the pixel electrode and liquid crystals placed between the pixel electrode and the common electrode.

The storage capacitor CS is connected in parallel with the liquid crystal capacitor CLC. The storage capacitor CS suppresses a potential variation in the pixel electrode and holds a pixel voltage applied to the pixel electrode until the next pixel voltage is applied to the pixel electrode again. The storage capacitor CS comprises a storage electrode disposed opposite the pixel electrode and an insulating film formed between the pixel electrode and the storage electrode. A common voltage Vcom is applied to the common electrode and the storage electrode by the common voltage supply circuit 14.

In the pixel 16 configured as described above, when the TFT 17 connected to the pixel electrode is turned on, the pixel voltage is applied to the pixel electrode via the signal line SL. The orientation state of the liquid crystals changes depending on the voltage difference between the pixel voltage and the common voltage Vcom. Thus, the transmissive state of the liquid crystals with respect to incident light and reflected light changes to provide image display.

The scanning driver 12 is connected to the plurality of scanning lines GL to sequentially drive the plurality of scanning lines GL based on a vertical control signal from the controller 15. The vertical control signal from the controller 15 is applied at every frame period. The "frame" refers to a period when a display signal is supplied to all the pixels in the liquid crystal panel to display one image.

The signal driver 13 is connected to the plurality of signal lines SL to load image data for one horizontal period based on a horizontal control signal from the controller 15. The horizontal control signal from the controller 15 is applied at every horizontal period that is a period when display signals for one row (one scanning line) in the liquid crystal panel 11 are transferred to the pixels. The signal driver 13 supplies the display signals corresponding to image data to the pixel electrodes via the signal lines SL.

The controller 15 generates various control signals allowing the liquid crystal panel 11 to display a desired image and supplies the control signals to the scanning driver 12, the signal driver 13, and the common voltage supply circuit 14.

In general, the liquid crystal display performs inversion driving (AC driving) in which the polarity of an electric field between the pixel electrode and the common electrode where the liquid crystals are placed is inverted. In the liquid crystal panel 11, the arrangement of the liquid crystal is determined depending on the electric field between the pixel electrode and the common electrode. However, continuous generation of an electric field of the same polarity between the pixel electrode and the common electrode may cause image persistence or degradation or destruction of the liquid crystals. Thus, this is prevented by periodically inverting the polarity of the electric field between the pixel electrode and the common electrode. Common inversion driving schemes are line inversion driving and frame inversion driving. The line inversion driving is a scheme in which the polarity of the electric field is inverted at every scanning line and also at every frame period. Furthermore, the frame inversion driving is a scheme in which the polarity of the electric field is inverted at every frame period for each pixel.

Figure 3:
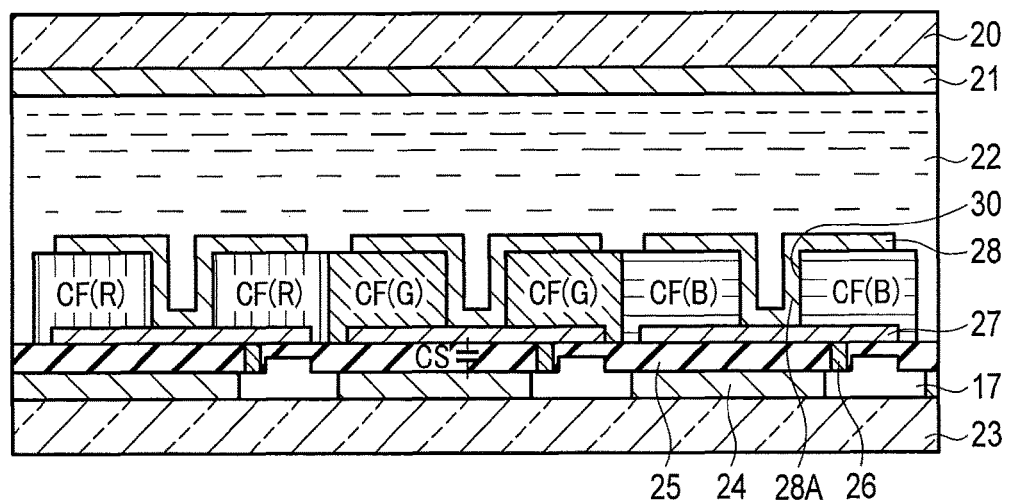
FIG. 3 is a cross-sectional view of a liquid crystal panel according to the first embodiment.

Next, a configuration of the liquid crystal panel 11 will be described. FIG. 3 is a cross-sectional view of the liquid crystal panel 11 taken along an extending direction of the scanning lines GL. The liquid crystal panel 11 comprises a reflective color PNLCD (Polymer Network Liquid Crystal Display). Furthermore, the liquid crystal panel 11 uses an active matrix scheme in which an active element is disposed in each of the pixels.

In the present embodiment, a color filter CF is disposed on a TFT substrate 23 with a reflective film 24 formed thereon. Only a common electrode 21 is provided on an opposite substrate (COM substrate) 20. A common voltage Vcom is applied to the common electrode 21 by the common voltage supply circuit 14. The COM substrate 20 is disposed on a front side of a display surface. The TFT substrate 23 is disposed on a back side of the display surface. That is, incident light is incident through the COM substrate 20.

The TFT substrate 23 is formed to be completely reflective by comprising the reflective film 24 all over a surface of the TFT substrate 23. In the example in FIG. 3, the reflective film 24 also functions as an electrode providing the storage capacitor CS. Thus, the common voltage Vcom is applied to the reflective film 24 by the common voltage supply circuit 14.

TFTs 17 and the reflective film 24 are provided on the TFT substrate 23. Electrodes 27 are provided on the TFTs 17 and the reflective film 24 via an insulating film 25. The electrodes 27 are electrically connected to drain electrodes of the respective TFTs 17 through respective contact plugs 26. Moreover, the color filter CF and a pixel electrode 28 are provided on each of the electrodes 27. A contact hole 30 is formed in a central portion of the color filter CF. The pixel electrode 28 is electrically connected to the electrode 27 through a contact plug 28A formed in the contact hole 30. A pixel voltage is applied to the pixel electrode 28 by the signal driver 13. The color filter CF comprises a plurality of coloring filters (coloring members), and specifically includes a red filter CF (R), a green filter CF (G), and a blue filter CF (B).

A liquid crystal layer 22 comprises a polymer network liquid crystal (PNLC). The PNLC has a structure in which liquid crystals are dispersed in a polymer network, and the liquid crystals in the polymer network have a continuous phase. A photocurable resin may be used as a polymer layer. For example, for the PNLC, ultraviolet light is radiated to a solution containing photopolymerized polymer precursors (monomers) mixed with liquid crystals to polymerize the monomers so that the liquid crystals are dispersed in the network of the resultant polymer. As the liquid crystals, for example, nematic liquid crystals with positive dielectric anisotropy are used.

Alternatively, the liquid crystal layer 22 may be formed of polymer dispersed liquid crystals (PDLC). The PDLCs have a structure in which the polymer disperses the liquid crystals, that is, the liquid crystals are subjected to phase separation in the polymer.

When the liquid crystal panel 11 according to the present embodiment is manufactured, first, the TFT substrate 23 with the reflective film 24 and the color filter CF and the COM substrate 20 with the common electrode 21 are formed. The substrates are bonded together via a spacer using a seal member, to form a cell. Subsequently, in a vacuum atmosphere, a solution containing the liquid crystals mixed into the photopolymerized polymer precursors (monomers) is injected into the cell. Alternatively, a liquid crystal dropping method (ODF: One Drop Fill) may be used to inject the liquid crystals to between the substrates. That is, the solution is dropped into a seal material formed on one of the substrates like a frame, and the other substrate is bonded to the first substrate to form a cell. Subsequently, ultraviolet light, which allows the monomers to be polymerized, is radiated from the COM substrate 20 side. No object such as wiring lines which blocks the ultraviolet light is present, and thus, the stability of polymerization of the monomers is improved.

Figure 4A:
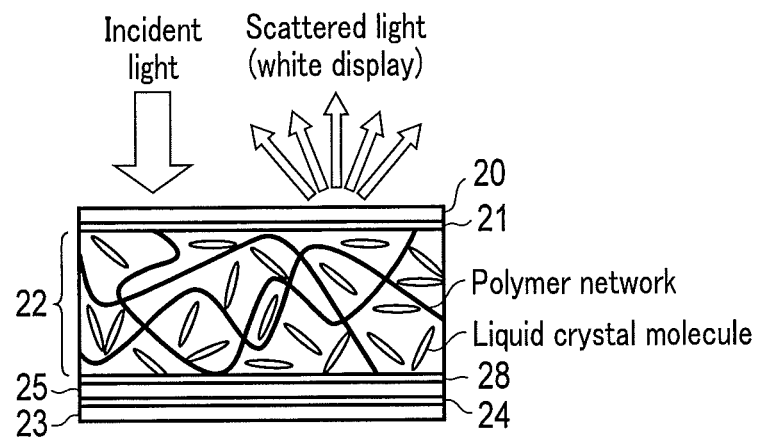
FIG. 4A is schematic diagram illustrating an orientation state of a liquid crystal layer.
Figure 4B:
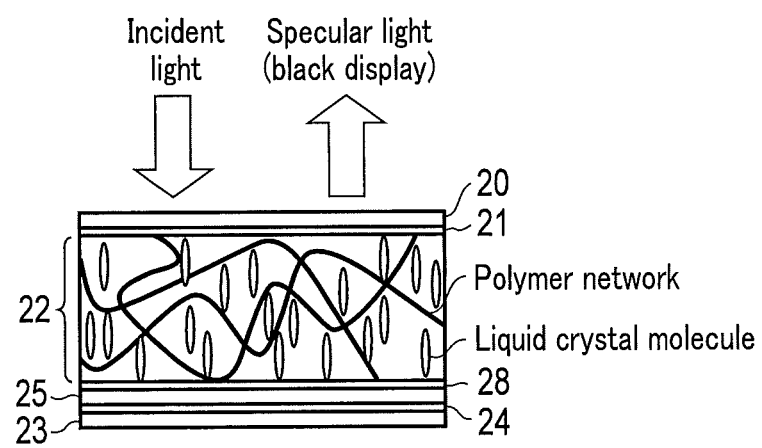
FIG. 4B is schematic diagram illustrating the orientation state of the liquid crystal layer.

FIGS. 4A and 4B are schematic diagrams illustrating the orientation state of the liquid crystal layer 22. In FIGS. 4A and 4B, illustration of the color filter and the TFT is omitted.

As depicted in FIG. 4A, when, for example, 0 V is applied to the pixel electrode 28 and the common electrode 21 and no electric field is applied to the liquid crystal layer 22 (off state), liquid crystal molecules dispersed in the polymer network are randomly oriented. In this case, the refractive index of the polymer is different from the refractive index of the liquid crystal molecules, and thus, incident light from the COM substrate 20 side scatters in the liquid crystal layer 22 (scattering state). The scattered light is reflected by the reflective film 24 and emitted through the COM substrate 20 as scattered light. At this time, the liquid crystal layer 22 is observed to be in an opaque cloudy state, and display viewed on the observation side is white display.

As depicted in FIG. 4B, when, for example, a high voltage (for example, 5 V) is applied to the pixel electrode 28, 0 V is applied to the common electrode 21, and an electric field is applied to the liquid crystal layer 22 (on state), the liquid crystal molecules dispersed in the polymer network are oriented in the direction of the electric field. In this case, the refractive index of the polymer and the refractive index of the liquid crystal molecules are approximately equal. Thus, incident light from the COM substrate 20 side is not scattered and is transmitted through the liquid crystal layer 22 (transparent state). Hence, reflected light is observed which results from reflection of the incident light by the reflective film 24. At this time, display light viewed on the observation side is specular light, and thus, light other than specularly reflected light is invisible and is black display (dark display). In actuality, since the color filter CF is disposed on the TFT substrate 23 side, color display dependent on the color of the color filter CF is obtained.

Figure 5:
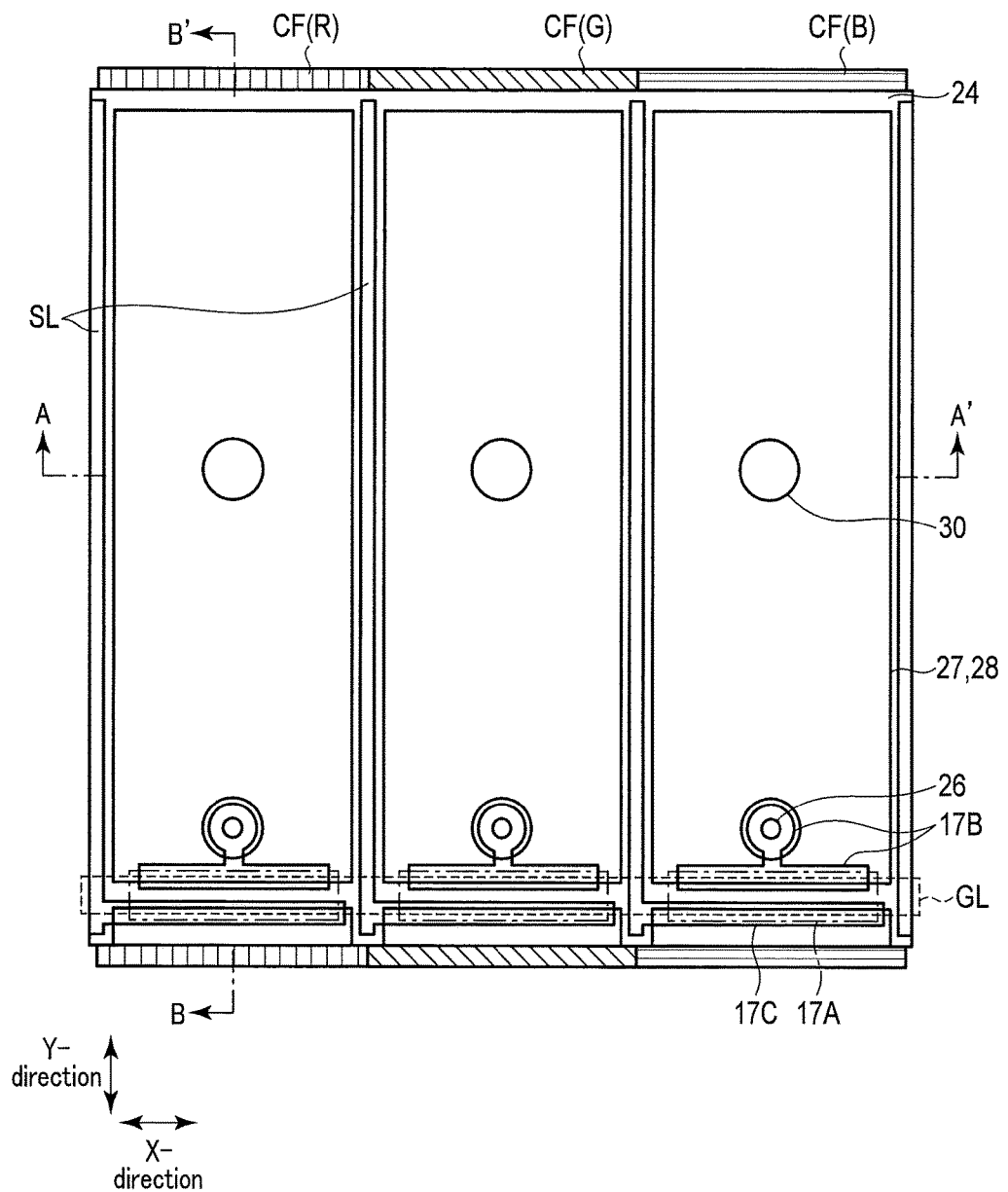
FIG. 5 is a layout of a liquid crystal panel according to a specific example.
Figure 6:
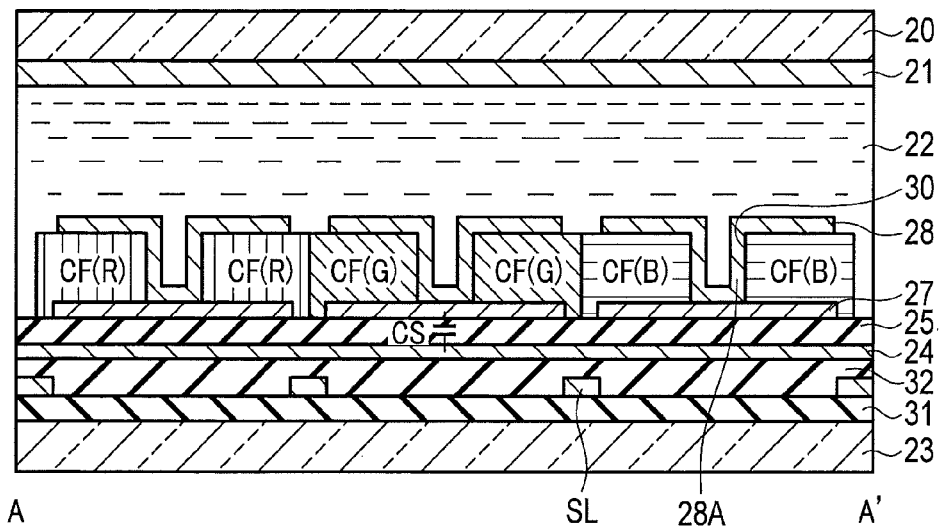
FIG. 6 is a cross-sectional view of the liquid crystal panel taken along line A-A' in FIG. 5.
Figure 7:
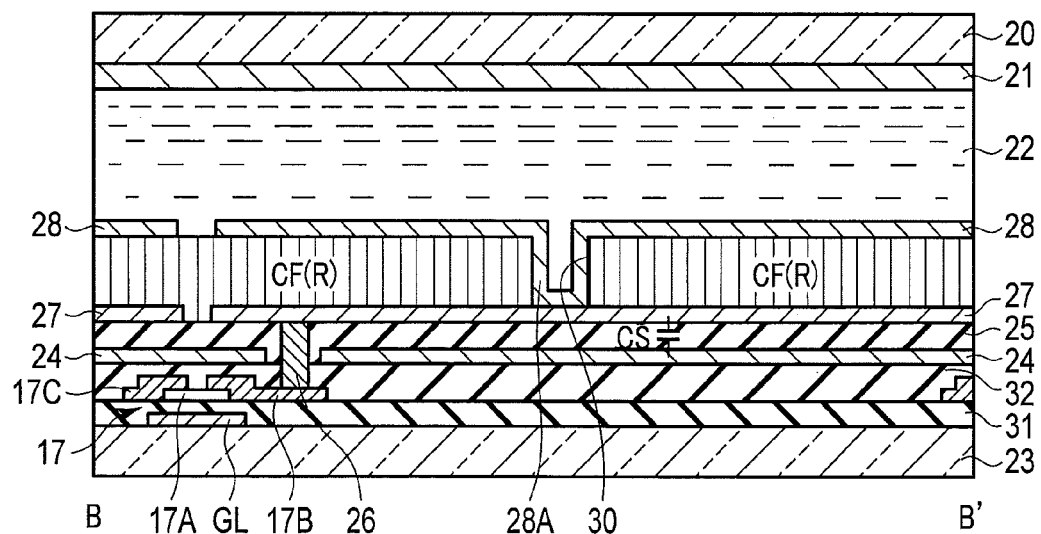
FIG. 7 is a cross-sectional view of the liquid crystal panel taken along line B-B' in FIG. 5.

Next, a specific configuration example of the liquid crystal panel 11 will be described. FIG. 5 is a layout of the liquid crystal panel 11. FIG. 6 is a cross-sectional view of the liquid crystal panel 11 taken along line A-A' in FIG. 5. FIG. 7 is a cross-sectional view of the liquid crystal panel 11 taken along line B-B' in FIG. 5.

Scanning lines GL extending in an X-direction are provided on the TFT substrate 23. The scanning line GL functions as a gate electrode of the TFT 17. A gate insulating film 31 is provided on the scanning line GL. A semiconductor layer 17A formed opposite the scanning line GL is provided on the gate insulating film 31. For example, amorphous silicon is used as the semiconductor layer 17A. A drain electrode 17B and a source electrode 17C are provided at respective opposite ends of the semiconductor layer 17A in a Y-direction so as to contact the semiconductor layer 17A.

The source electrode 17C is electrically connected to the signal line SL formed on the gate insulating film 31 and extending in the Y-direction. The drain electrode 17B comprises a first electrode extending in the X-direction and a second electrode extracted in the Y-direction. A contact plug 26 is provided on the second electrode. The TFT 17 comprises the semiconductor layer 17A, the semiconductor layer 17A, the drain electrode 17B, the source electrode 17C, the gate insulating film 31, and the scanning line (gate electrode) GL. For example, chromium (Cr), a molybdenum alloy (MoNb or the like), or an aluminum alloy (Al alloy) is used as the drain electrode 17B, the source electrode 17C, the scanning line GL, and the signal line SL. For example, a silicon nitride (SiN) is used as the gate insulating film 31.

An insulating film 32 is provided on the TFT 17, and the reflective film 24 is provided on the insulating film 32. The reflective film 24 is formed all over the pixel array except for areas through which the contact plugs 26 pass. The reflective film 24 also has a function to serve as an electrode of the storage capacitor CS. For example, an aluminum alloy (Al alloy) is used as the reflective film 24.

An insulating film 25 is provided on the reflective film 24, and the electrode 27 is provided on the insulating film 25. The electrode 27 has a function to electrically connect the drain electrode 17B of the TFT 17 and the pixel electrode 28 together and a function to set the capacitance of the storage capacitor CS to a predetermined value in accordance with the size of the planar shape of the electrode 27. Thus, the electrode 27 extends in the Y-direction and is electrically connected, at an end thereof in the Y-direction, to the drain electrode 17B of the TFT 17 through the contact plug 26. The electrode 27 is further electrically connected to the pixel electrode 28 through a contact plug 28A in the central portion of the pixel. The contact plug 26 may be formed integrally with the electrode 27 or the contact plug 26 and the electrode 27 may be individually formed. The contact plug 26 is formed of, for example, the same material as that of the electrode 27. In the present embodiment, the electrode 27 has approximately the same planar shape as that of the pixel electrode 28 in order to increase the capacitance of the storage capacitor CS. The electrode 27 comprises a transparent electrode, and for example, ITO (Indium Tin Oxide) is used as the electrode 27. For example, a silicon nitride (SiN) is used as the insulating films 25 and 32.

The color filter CF is provided on the electrode 27. The color filter CF has a planar shape the size of which is the same as the size of the pixel. A contact hole 30 is formed in the central portion of the color filter CF. The pixel electrode 28 is provided on the color filter CF. The pixel electrode 28 is electrically connected to the electrode 27 through the contact plug 28A formed in the contact hole 30. The contact plug 28A may be formed integrally with the pixel electrode 28 as depicted in FIG. 6 or the contact plug 28A and the pixel electrode 28 may be individually formed. The contact plug 28A is formed of, for example, the same material as that of the pixel electrode 28.

The COM substrate 20 is disposed opposite the TFT substrate 23. The liquid crystal layer 22, formed of a polymer network liquid crystal, is provided between the COM substrate 20 and the TFT substrate 23. The liquid crystal layer 22 is sealed by a seal member (not depicted in the drawings) that is used for bonding the COM substrate 20 and the TFT substrate 23. Only the common electrode 21 is provided on the liquid crystal layer 22 side of the COM substrate 20. The common electrode 21 or the pixel electrode 28 each comprise a transparent electrode, and for example, ITO is used as the common electrode 21 and the pixel electrode 28. As each of the COM substrate 20 and the TFT substrate 23, a transparent substrate formed of glass, quartz, plastic, or the like is used.

(Effects)

As described above in detail, in the first embodiment, the COM substrate 20 comprises only the common electrode 21 and is formed to be transmissive. The TFT substrate 23 comprises the plurality of TFTs 17, the reflective film 24, the color filter CF, and the plurality of pixel electrodes 28 and is formed to be completely reflective. The liquid crystal layer 22, formed of a polymer network liquid crystal (PNLC), is provided between the COM substrate 20 and the TFT substrate 23. Thus, the color liquid crystal panel 11 is provided which is based on the active matrix scheme and which is reflective.

Therefore, according to the first embodiment, when ultraviolet light is radiated to the liquid crystal panel 11 in order to polymerize the monomers in the liquid crystal layer 22, the ultraviolet light can be radiated from the COM substrate 20 side, where no element that blocks the ultraviolet light is formed. This enables the monomers to be generally and stably polymerized, allowing the polymer to be uniformly formed in the liquid crystal layer 22. As a result, the reflectance (scattering performance) and reliability of the liquid crystal panel 11 can be improved.

Furthermore, since the COM substrate 20, on which only the common electrode 21 comprising a transparent electrode is formed, is disposed on the front side of the display surface, an area above the wiring line and transistor can be used as a display area. This enables an increase in aperture ratio.

For example, when the TFT substrate is disposed on the front side of the display surface, incident light is reflected by the TFTs and the wiring lines connected to the TFTs. Thus, the display area is glaring (garish). On the other hand, in the present embodiment, since no TFT and no wiring line are formed on the COM substrate 20 through which light is incident, the display surface can be prevented from appearing garish.

Furthermore, the liquid crystal panel 11 that can provide bright display can be implemented. For example, a twist nematic liquid crystal display element uses a polarizing plate. The polarizing plate absorbs a very large amount of light. In contrast, the liquid crystal panel 11 according to the present embodiment uses no polarizing plate and can thus provide bright display compared to the twist nematic liquid crystal display element and the like.

(Comparative Example)

Figure 8:
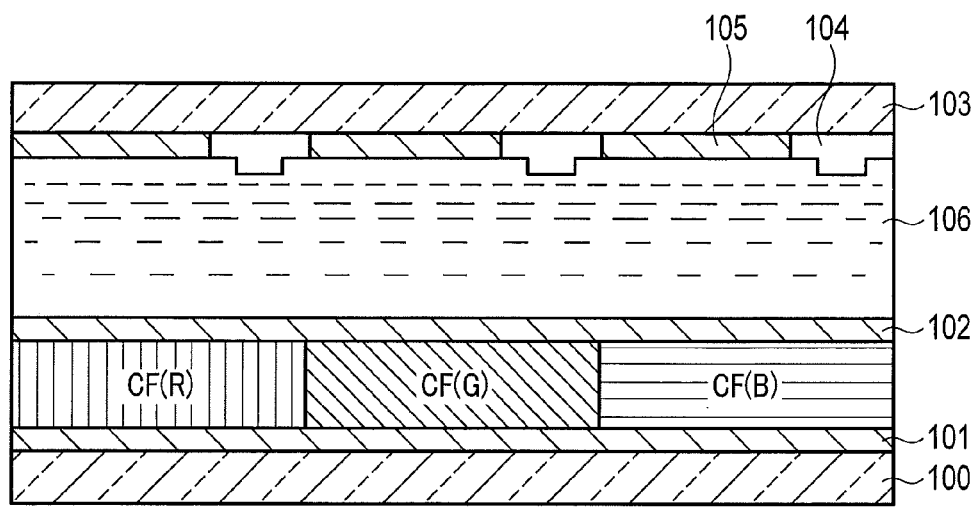
FIG. 8 is a cross-sectional view of a liquid crystal panel according to a comparative example.

FIG. 8 is a cross-sectional view of a liquid crystal panel according to a comparative example. In the liquid crystal panel according to the comparative example, a TFT substrate with TFTs is disposed on the front side of a display surface, and a color filter substrate with a reflective film and color filters is disposed on the back side of the display surface.

Specifically, a reflective film 101 is provided on a color filter substrate (CF substrate) 100. Color filters CF are provided on the reflective film 101. A common electrode 102 is provided on the color filters CF. TFTs 104 and pixel electrodes 105 electrically connected to the TFTs 104 are provided on a TFT substrate 103. A liquid crystal layer 106 formed of a polymer network liquid crystal is sandwiched between the CF substrate 100 and the TFT substrate 103.

As described above, in the comparative example, the CF substrate 100 is formed to be reflective using the reflective film 101 formed thereon, and the TFT substrate 23 is formed to be transmissive. That is, incident light is incident through the TFT substrate 103. Hence, ultraviolet light used to polymerize monomers in the liquid crystal layer 106 is blocked by the TFTs 104 formed on the TFT substrate 103 and wiring lines connected to the TFTs 104. Thus, the comparative example fails to generally polymerize the monomers.

Figure 9A:
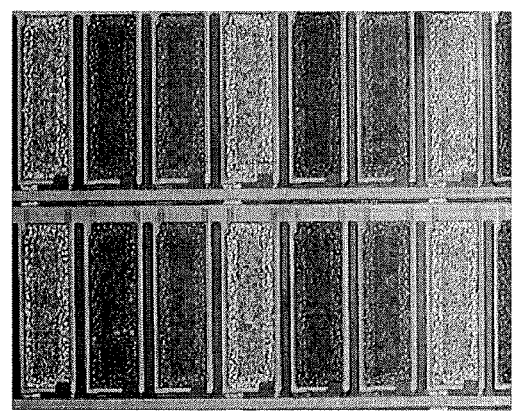
FIG. 9A is a diagram illustrating the state of a liquid crystal layer according to the comparative example.

FIGS. 9A and 9B are diagrams illustrating the state of the liquid crystal layer 106 according to the comparative example. FIGS. 10A and 10B are diagrams illustrating the state of the liquid crystal layer 22 according to the first embodiment. FIG. 9A and FIG. 10A depict the liquid crystal layer having been irradiated with ultraviolet light in order to polymerize the monomers. FIG. 9B and FIG. 10B are partially enlarged views of FIG. 9A and FIG. 10A, respectively.

In the comparative example, the polymer is not uniform, and particularly near the TFTs and the wiring lines, the liquid crystal layer fails to be sufficiently irradiated with ultraviolet light, resulting in insufficient polymerization of the monomers. On the other hand, in the present embodiment, the liquid crystal layer is generally and uniformly irradiated with ultraviolet light. Thus, the polymer is uniform, and the monomers are uniformly polymerized throughout the liquid crystal layer.

Figure 11:
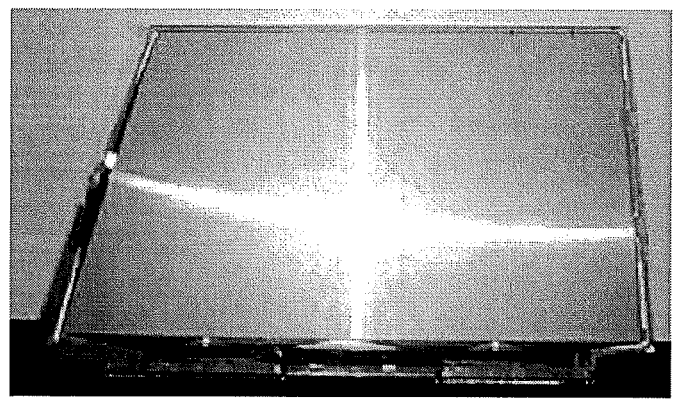
FIG. 11 is a diagram illustrating the state of reflected light from the liquid crystal panel according to the comparative example.
Figure 12:
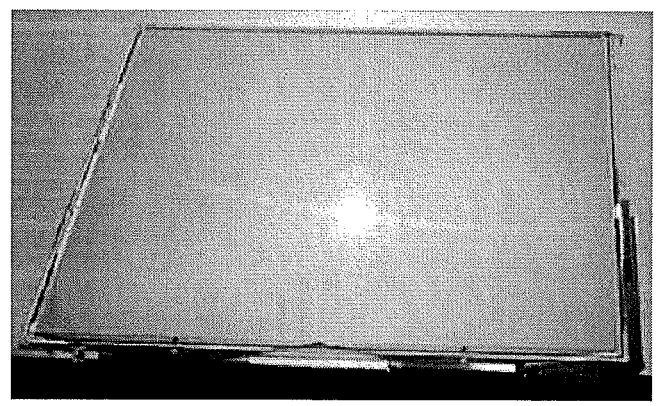
FIG. 12 is a diagram illustrating the state of reflected light from the liquid crystal panel according to the first embodiment.

FIG. 11 is a diagram illustrating the state of reflected light on the liquid crystal panel according to the comparative example. FIG. 12 is a diagram illustrating the state of reflected light on the liquid crystal panel according to the first embodiment. In the comparative example, since incident light is reflected by the TFTs 104 and the wiring lines connected to the TFTs 104, the display on the liquid crystal panel is glaring (garish). On the other hand, in the present embodiment, since no TFT and no wiring line are formed on the substrate side on which light is incident, the display on the liquid crystal panel can be prevented from appearing garish.

[Second Embodiment]

In a second embodiment, a reflective film is used as an electrode of a storage capacitor CS, and a color filter is used as an interlayer insulating film of the storage capacitor CS.

Figure 14:
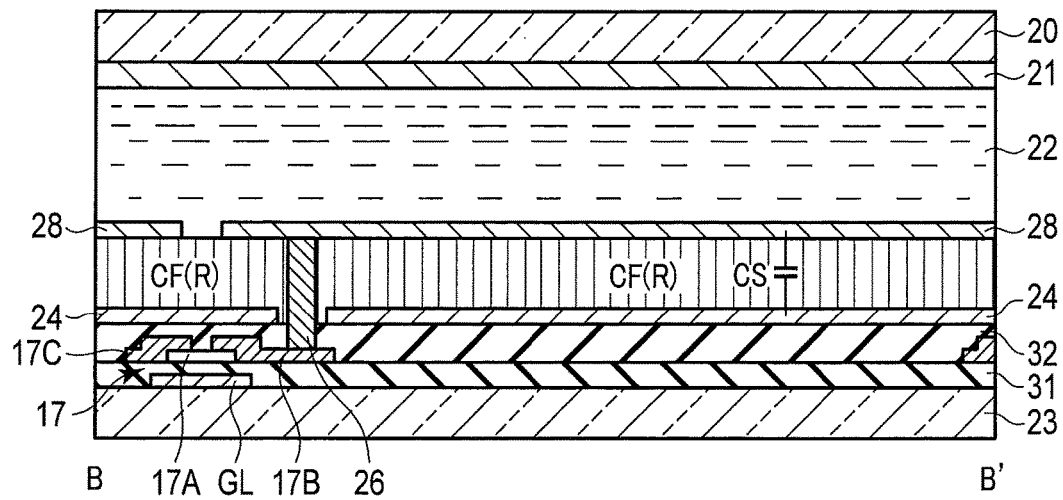
FIG. 14 is a cross-sectional view of the liquid crystal panel taken along line B-B' in FIG. 13.

FIG. 13 is a layout of a liquid crystal panel 11 according to the second embodiment. FIG. 14 is a cross-sectional view of the liquid crystal panel 11 taken along line B-B' in FIG. 13.

A reflective film 24 is provided on an insulating film 32. The reflective film 24 is formed all over a pixel array except for areas through which contact plugs 26 pass. The reflective film 24 also has a function to serve as an electrode of the storage capacitor CS. For example, an aluminum alloy (Al alloy) is used as the reflective film 24.

A color filter CF is provided on the reflective film 24. A pixel electrode 28 is provided on the color filter CF. The reflective film 24, the color filter CF, and the pixel electrode 28 provide the storage capacitor CS. That is, the color filter CF has not only a function to control the wavelength of transmitted light but also a function to serve as an interlayer insulating film of the storage capacitor CS. The color filters CF are formed of a resin containing a coloring material. A common voltage Vcom is applied to the reflective film 24 by a common voltage supply circuit 14.

The pixel electrode 28 is electrically connected to a drain electrode 17B of a TFT 17 through a contact plug 26 formed in the color filter CF and an insulating film 32. The contact plug 26 is electrically separated from the reflective film 24. The contact plug 26 may be formed integrally with the pixel electrode 28. The contact plug 26 and the pixel electrode 28 may be individually formed. The contact plug 26 is formed of, for example, the same material as that of the pixel electrode 28.

The second embodiment does not need the electrode 27 in the first embodiment. Hence, the laminate structure of the liquid crystal panel 11 can be simplified. For the other effects, the second embodiment is the same as the first embodiment.

[Third Embodiment]

In a third embodiment, a reflective film 24 is formed in the same layer as the electrode 27 according to the first embodiment, and color filters CF are disposed on the reflective film 24.

Figure 15:
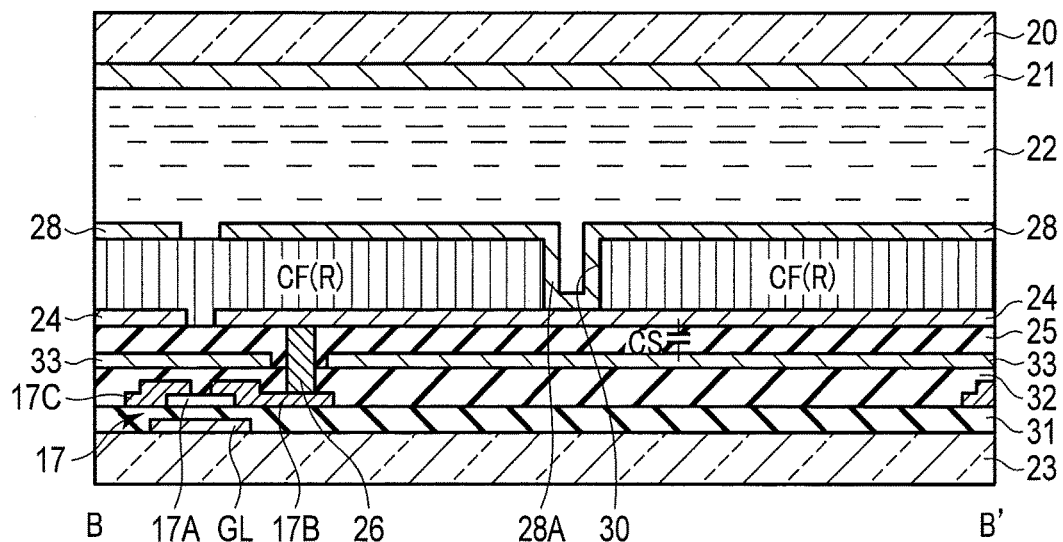
FIG. 15 is a cross-sectional view of a liquid crystal panel according to a third embodiment.

FIG. 15 is a cross-sectional view of a liquid crystal panel 11 according to the third embodiment. The cross-sectional view in FIG. 15 corresponds to a cross-sectional view taken at the position of line B-B' in FIG. 5. A layout of the liquid crystal panel 11 according to the third embodiment corresponds to FIG. 5 in which the electrode 27 and the reflective film 24 are replaced with the reflective film 24 and an electrode 33, respectively.

The electrode 33 providing a storage capacitor CS is provided on the insulating film 32. The electrode 33 is formed all over a pixel array except for areas through which contact plugs 26 pass. The electrode 33 corresponds to an electrode of a storage capacitor CS. The electrode 33 comprises a transparent electrode, and for example, ITO is used as the electrode 33.

An insulating film 25 is provided on the electrode 33. The reflective film 24 is provided on the insulating film 25. The planar shape of the reflective film 24 is substantially the same as the planar shape of the pixel electrode 28. That is, in the first embodiment, the reflective film 24 is formed all over the pixel array as a continuous film (However, the reflective film 24 has openings through which contact plugs pass), whereas in the third embodiment, a plurality of reflective films 24 provided for the respective pixels are formed on the insulating film 25. For example, an aluminum alloy (Al alloy) is used as the reflective film 24. A color filter CF is provided on the reflective film 24. The pixel electrode 28 is provided on the color filter CF.

The reflective film 24 electrically connects the pixel electrode 28 and a source electrode 17B of a TFT 17 together. That is, the reflective film 24 is electrically connected to the pixel electrode 28 through a contact plug 28A formed in the color filter CF and electrically connected to the source electrode 17B of the TFT 17 through the contact plug 26. The contact plug 26 may be formed integrally with the pixel electrode 28 or the contact plug 26 and the pixel electrode 28 may be individually formed. The contact plug 26 is formed of, for example, the same material as that of the pixel electrode 28.

According to the third embodiment, the reflective film 24 can be disposed at a position closer to the color filter CF. For the other effects, the third embodiment is the first embodiment.

[Fourth Embodiment]

In a fourth embodiment, an insulating film (for example, an orientation film) is formed on a COM substrate 20 and on a TFT substrate 23 so as to contact a liquid crystal layer 22. This improves the insulation between the COM substrate 20 and the TFT substrate 23 to prevent possible short-circuiting between the COM substrate 20 and the TFT substrate 23.

FIG. 16 is a cross-sectional view of a liquid crystal panel 11 according to the fourth embodiment. The cross-sectional view in FIG. 16 corresponds to a cross-sectional view taken at the position of line B-B' in FIG. 5. An insulating film 40 is provided on a liquid crystal side of a common electrode 21. The insulating film 40 is formed all over the COM substrate 20.

An insulating film 41 is provided on a liquid crystal side of a pixel electrode 28. The insulating film 41 is formed all over the TFT substrate 23. For example, an orientation film is used as each of the insulating films 40 and 41, and a polyimide film is used as the orientation film. For the remaining part of the configuration, the fourth embodiment is the same as the first embodiment.

According to the fourth embodiment, the insulation between the COM substrate 20 and the TFT substrate 23 can be improved. This allows prevention of possible short-circuiting between the COM substrate 20 and the TFT substrate 23 while a voltage is being applied to the liquid crystal panel 11. Thus, the liquid crystal panel 11 with improved reliability can be provided. Furthermore, when an orientation film is used as each of the insulating film 40 and 41, the contact between each of the insulating films 40 and 41 and a liquid crystal layer 22 is improved. Consequently, the liquid crystal layer 22 can be suppressed from being defective, and the display quality of the liquid crystal panel 11 can thus be suppressed from being degraded.

The liquid crystal panel 11 may be configured to comprise only one of the insulating films 40 and 41. Even in this configuration, the insulation between the COM substrate 20 and the TFT substrate 23 can be improved.

[Fifth Embodiment]

In a fifth embodiment, a light-shielding layer (black matrix) is formed at boundary portions between a plurality of pixels to improve the contrast of a displayed image.

FIG. 17 is a cross-sectional view of a liquid crystal panel 11 according to the fifth embodiment, taken along an X-direction (an extending direction of scanning lines GL). FIG. 18 is a cross-sectional view of the liquid crystal panel 11 according to the fifth embodiment, taken along a Y-direction (an extending direction of signal lines SL). The cross-sectional view in FIG. 17 corresponds to a cross-sectional view taken at the position of line A-A' in FIG. 5. The cross-sectional view in FIG. 18 corresponds to a cross-sectional view taken at the position of line B-B' in FIG. 5.

A light-shielding layer (black matrix) BM is provided on an insulating film 25 and an electrode 27. The light-shielding layer BM is disposed at boundary portions between the plurality of pixels 16. In other words, the light-shielding layer BM is formed to enclose each of the plurality of pixels 16 and formed like mesh. The light-shielding layer BM has a function to shield a light-shielding target pattern formed on a TFT substrate 23 from light. Specifically, the light-shielding layer BM is disposed to cover wiring (scanning lines GL and signal lines SL) connected to TFTs 17. For example, a back organic resin may be used as the light-shielding layer BM. The light-shielding layer BM may be formed by mixing a black pigment (organic pigment, carbon black, titanium black, or the like) into a resin material such as photosensitive or non-photosensitive polyimide.

Color filters CF are provided on the light-shielding layer BM. For the remaining part of the configuration, the fifth embodiment is the same as the first embodiment.

According to the fifth embodiment, the light-shielding layer BM is disposed at the boundary portions between the plurality of pixels 16, allowing the contrast of the displayed image to be improved. In addition, when the light-shielding layer BM is installed, reflectance slightly decreases.

FIG. 19 is a cross-sectional view of a liquid crystal panel 11 according to a modification of the fifth embodiment, taken along the X-direction (the extending direction of the scanning lines GL).

At the boundary between adjacent pixels with different colors, two coloring members with different colors contained in the color filters CF are formed so as to overlap at ends of coloring members. The overlapping portions of the two coloring members in different colors function as a light-shielding layer (black matrix) BM.

At the boundary between pixels adjacent to each other in the Y-direction (the extending direction of the signal lines SL), the black matrix may be omitted as depicted in FIG. 7 or may be provided as depicted in FIG. 18.

The present invention is not limited to the embodiments described above, and can be embodied by modifying constituent elements without departing from the gist of the invention. In addition, the above embodiments include inventions of various stages, and various inventions can be formed by proper combinations of a plurality of constituent elements disclosed in one embodiment or proper combinations of constituent elements disclosed in different embodiments. When, for example, the problems to be solved by the present invention can be solved and the effects of the invention can be obtained even if several constituent elements are omitted from all the constituent elements disclosed in each embodiment, an embodiment from which these constituent elements are omitted can be extracted as an invention.

What is claimed is:

1. A liquid crystal display comprising:
   first and second substrates;
   a liquid crystal layer sandwiched between the first and second substrates and comprising a polymer network liquid crystal (PNLC) or a polymer dispersed liquid crystal (PDLC);
   a common electrode provided on the first substrate;
   transistors provided on the second substrate for respective pixels;
   a reflective film provided above the transistors via an insulating film;
   transparent electrodes provided above the reflective film via an insulating film, and electrically connected to drain electrodes of the transistors, respectively;
   color filters provided on the transparent electrodes, respectively; and
   pixel electrodes provided on the color filters, and electrically connected to the transparent electrodes, respectively,
   wherein the transparent electrodes together with the reflective film function as storage capacitors included in the respective pixels.

2. The liquid crystal display according to claim 1, further comprising contact plugs provided in the color filters, and electrically connecting the pixel electrodes and the transparent electrodes, respectively.

3. The liquid crystal display according to claim 1, further comprising an insulating film provided on one or both of the first and second substrates in contact with the liquid crystal layer.

4. The liquid crystal display according to claim 1, further comprising a light-shielding layer provided at boundary portions between the pixels.

5. The liquid crystal display according to claim 1, wherein adjacent color filters overlap at ends thereof, and
   the overlapping portion functions as a light-shielding layer.

6. The liquid crystal display according to claim 1, wherein ultraviolet light used to polymerize monomers in the liquid crystal layer is radiated from the first substrate side.

7. The liquid crystal display according to claim 1, wherein a common voltage, which is applied to the common electrode, is applied to the reflective film.

8. The liquid crystal display according to claim 1, wherein the reflective film overlaps the pixel electrodes.

9. The liquid crystal display according to claim 1, wherein the reflective film covers the transistors.

10. The liquid crystal display according to claim 1, wherein one of the transparent electrodes is the same planar shape as one of the pixel electrodes.

* * * * *